United States Patent [19]

Holland et al.

[11] Patent Number: 4,855,058

[45] Date of Patent: Aug. 8, 1989

[54] HIGH RECOVERY SPIRAL WOUND MEMBRANE ELEMENT

[75] Inventors: Eric C. Holland, Goleta; Fredrick K. Lesan, Oxnard; Peter H. Knappe, Ventura, all of Calif.

[73] Assignee: Hydranautics, Goleta, Calif.

[21] Appl. No.: 188,758

[22] Filed: May 2, 1988

Related U.S. Application Data

[63] Continuation of Ser. No. 877,906, Jun. 24, 1986, abandoned.

[51] Int. Cl.[4] .............................................. B01D 13/00
[52] U.S. Cl. ................. 210/652; 210/321.74; 210/321.78; 210/321.83; 210/321.87
[58] Field of Search ............ 210/650, 652, 321.74, 210/433.2, 497.1, 321.83, 321.78, 321.87; 55/16, 158; 422/48

[56] References Cited

U.S. PATENT DOCUMENTS

| | | | |
|---|---|---|---|
| 3,252,272 | 5/1966 | Hazen et al. | 55/158 |
| 3,367,504 | 2/1968 | Westmoreland | 264/49 |
| 3,417,870 | 12/1968 | Bray | 210/321.1 |
| 3,493,496 | 2/1970 | Bray et al. | 210/321.5 |
| 3,504,796 | 4/1970 | Bray | 210/321.5 |
| 3,567,632 | 3/1971 | Richter et al. | 210/321.1 |
| 3,597,393 | 8/1971 | Bach et al. | 524/233 X |
| 3,615,024 | 10/1971 | Michaels | 210/490 |
| 3,933,646 | 1/1976 | Kanamary et al. | 210/321.5 |
| 3,951,815 | 4/1976 | Wrasidlo | 210/500.27 |
| 4,039,440 | 8/1977 | Cadotte | 210/500.41 |
| 4,235,723 | 11/1980 | Bartlett | 210/321.5 |
| 4,277,344 | 7/1981 | Cadotte | 210/500.38 X |
| 4,392,958 | 7/1983 | Ganzi et al. | 210/493.2 |
| 4,399,035 | 8/1983 | Nohmi et al. | 210/500.23 |

FOREIGN PATENT DOCUMENTS 3220613 12/1983 Fed. Rep. of Germany .
124179 10/1978 Japan .

Primary Examiner—Frank Sever
Attorney, Agent, or Firm—Sughrue, Mion, Zinn, Macpeak & Seas

[57] ABSTRACT

This invention is a spiral wound membrane filtration element for reverse osmosis, ultrafiltration, microfiltration and filtration of gas mixtures and having a novel radial feed-concentrate flow path and axial permeate discharge allowing conversion of a feed mixture to be varied to any practical desired degree without regard to the membrane elements length while maintaining turbulent or chopped laminar hydrodynamic flow conditons where desired, and a method of using said membrane elements in a filtration process.

24 Claims, 4 Drawing Sheets

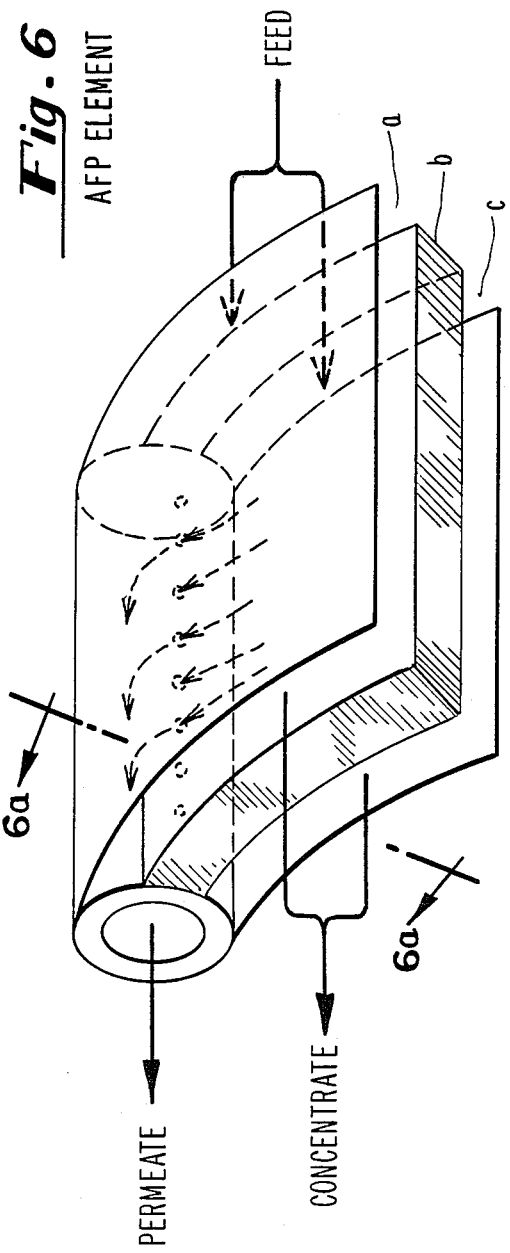
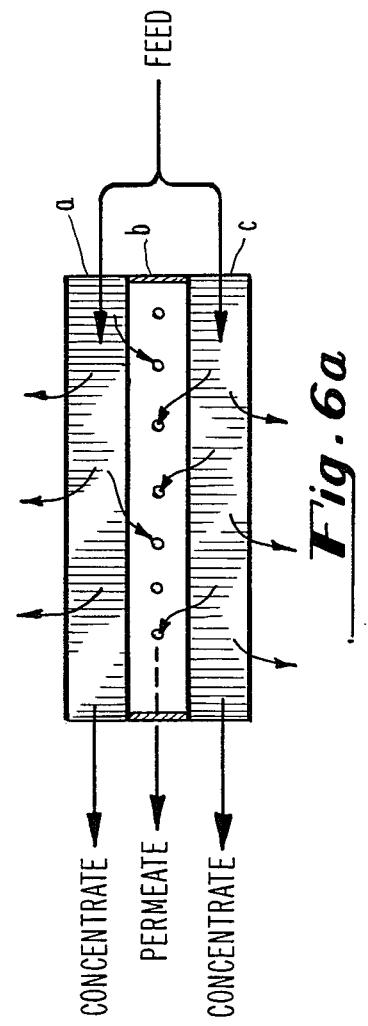

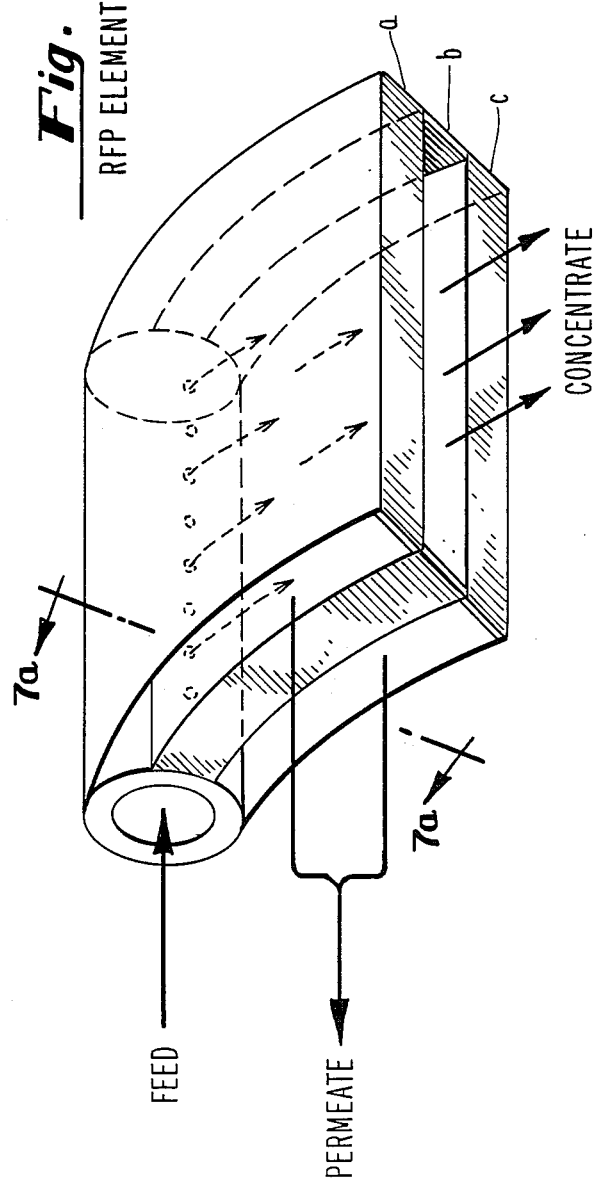
Fig. 7 RFP ELEMENT
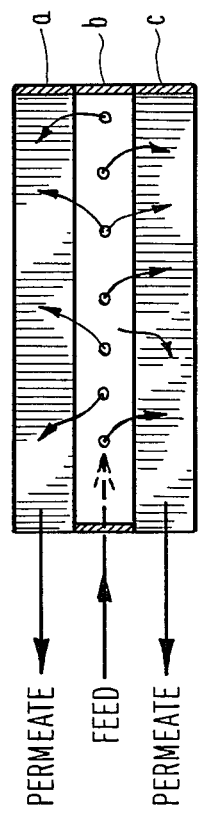
Fig. 7a

HIGH RECOVERY SPIRAL WOUND MEMBRANE ELEMENT

This is a continuation of application Ser. No. 877,906 filed June 24, 1986, now abandoned.

BACKGROUND OF INVENTION

A. Field

This invention relates to an improved membrane separation device of the spiral wound type useful for ultrafiltration, microfiltration and reverse osmosis applications and capable of obtaining high conversions while maintaining turbulent or chopped laminar hydrodynamic flow conditions, including methods of use. More specifically, the invention relates to a spiral wound membrane element device having a radial feed path ("RFP" herein) and thereby providing a potential for much higher conversion rates in a single element than heretofore possible.

B. Description of the Prior Art

Spiral membrane elements for ultrafiltration, microfiltration and reverse osmosis have long been regarded as efficient devices for separating components of fluid mixtures. In a typical process, a pressurized fluid mixture is brought into contact with a membrane surface whereby one or more components of that fluid mixture pass through the membrane because of a difference in chemical potential and, due to varying mass transport rates through the membrane, a separation is achieved.

The most common spiral membrane element known heretofore is designed to have the fluid feed mixture enter at one end of the cylindrical membrane element and travel across the spiral windings between parallel membrane surfaces along the longitudinal axis of the element (axial feed path-"AFP" herein). Separation occurs at the membrane-fluid interface resulting in (1) a more concentrated feed stream and (2) a permeate, which is the fluid passing through the membrane barrier layer. The permeate stream travels in a spiraling radial direction within the separate sealed channel defined by the permeate sides of two membranes until it reaches the porous central core tube where it is collected and expelled out one or both ends of the core tube (see, U.S. Pat. Nos. 4,235,723, 3,367,504, 3,504,796, 3,493,496, 3,417,870).

Spiral wound membranes invariably contain a flow path or channel for the feed enclosed by membrane sheets with active membrane barrier layers facing said flow path. In the case of anisotropic membranes containing a single barrier layer on only one side of the sheet, it is conventional for the membrane sheets to have the barrier layers facing each other and separated by a spacer which promotes turbulence in the feed flow path. The membranes are edge-sealed with adhesives or heat sealed, etc. in such a manner as to furnish an inlet for feed and an outlet for concentrate (since "feed" becomes "concentrate" as it passes along the membrane, the stream within the membrane element may be optionally termed "feed-concentrate" herein).

The conversion (i.e. the ratio of permeate volume to feed volume) for the common prior art spiral elements is governed by the element's length (see, Desalination by Reverse Osmosis, Ulrich Merten, 1966, Chapter 5). Typically, unit conversions are far below commercial process requirements, requiring numerous elements in series to achieve acceptable converions. For example, a typical remote osmosis system operating at 75% conversion might require eighteen one meter long elements in a 2-1 array of pressure vessels producing a feed-concentrate flow path length of 12 meters (i.e., first stage has six elements in series in each of two parallel trains and the second stage has six elements in series in a single train). The requirement for arraying spiral elements in series depending on the fouling potential of the feed water with the above example being most commonly employed on municipal, well, and surface-water feeds without extraordinary pretreatment.

For desalination systems requiring high conversions and permeate flows below 75,000 to 100,000 GPD, (gallons per day), small diameter elements (less than 8 inches) must be used to maintain arrays with 12 meter feed-concentrate path lengths. The drawbacks to this method of obtaining high conversion include (a) increased floor space requirements, (b) increased membrane module cost on a cents per gallon basis, (c) increased process and pressure vessel costs, and (d) added complexity of expanding systems due to array requirements.

If it were possible to change the element flow path from the standard axial (AFP) to a radial direction (RFP), the flow path may be tailored to the desired conversion rate or even increased; thus such module's conversion would be governed by its diameter rather than length.

Unfortunately, it is not a simple matter to design a practical radial flow path element since the permeate collected within the permeate channel must not travel more than one to two meters before exiting the module, or excess back pressure is generated in the permeate carrier fabric reducing the element's efficiency. This constraint eliminates the possibility of successfully utilizing the principle of the flowpath design of U.S. Pat. No. 3,933,646 containing one or more very long membrane envelopes in which the permeate travels the length of the membrane envelope before entering the core tube and exiting the module.

SUMMARY OF INVENTION

A. We have now discovered a spiral wound membrane element device that can operate at high conversions (i.e. greater than 30% and up to but not limited to 90%) while maintaining turbulent or chopped laminar flow conditions. This is accomplished by designing the feedconcentrate path to spiral radially (RFP), preferably outwardly from the central core tube while collecting the permeate through one or both open lateral edges of the membrane element. This latter feature provides a maximum permeate flow path not greater than the element's axial length and independent of the feed-concentrate flow path length. The high pressure seal between individual membrane sheets and the permeate fluid is accomplished by sealing the product water carrier fabric with an adhesive (or thermally) while recessing the membrane and spacer materials from the edge of the permeate carrier fabric.

B. This new spiral wound element does not require serial staging in order to operate at commercially viable system conversions for either ultrafiltration ("UF"), microfiltration ("MF"), or reverse osmosis ("RO") applications. Accordingly, small reverse osmosis systems ranging in flow from 3000 to 75,000 GPD may be produced with large diameter elements (8–12 inches or larger). System design can be modular, i.e. elements may be added on a unit basis without the need for maintaining proper arrays. Smaller systems (less than 3000 GPD) may be produced by decreasing the element length and/or diameter.

BRIEF DESCRIPTION OF THE DRAWINGS

This invention may be better understood and its numerous objectives and advantages will become apparent to those skilled in the art by reference to the accompanying drawings. A reverse osmosis element is illustrated since RO design requirements are perhaps the most critical because of the high hydraulic pressures needed for filtration.

FIGS. 6 and 7 which diagrammatically illustrate the prior art elements and the RFP membrane elements of the present invention, respectively, together with their sections 6a and 7a, are included for the purpose of explaining the different membrane flow paths.

Figure 1:
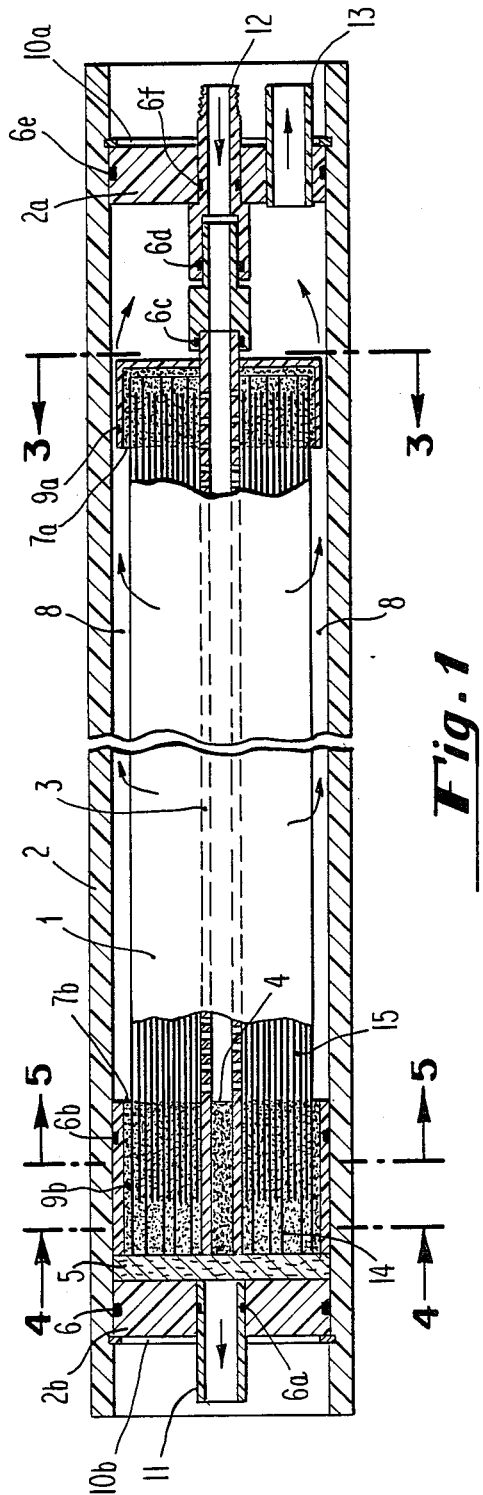
FIG. 1 is a cut-away view illustrating the spiral wound RFP membrane element of the invention within an external cylindrical pressure housing.

The manufacture of spiral wound membrane elements for reverse osmosis, ultrafiltration and microfiltration applications is well known in the art. Flat sheet membranes, alternately containing, between the membrane sheets, open porous fabric or plastic sheets or webs are attached to (normally with adhesive) and wound about a central porous "core" tube. The open porous sheets between membranes serve primarily to transport the fluid, create turbulence (in the case of a brine spacer, etc.) and prevent the collapse of the flow channel.

As used herein, and in the appended claims, for convenience the term "spacer" or "spacer sheets" without qualification is intended to define the common porous sheet materials known to the membrane filtration art, particularly the reverse osmosis field, as useful for providing a solid but porous conduit for permeate fluid or turbulence in a stream flowing within a confined channel or merely to space membrane sheets or prevent collapse of the channel between membranes under elevated pressures. Such "spacer sheets" as used heretofore are normally of fabric or plastic composition but any durable flat sheet material capable of performing the above-stated functions upon assembly into spiral wound membrane elements should be deemed within the purview of the term "spacer."

In most instances, there is a feed (brine in the case of RO) spacer on the feed-condensate side of the membrane leaf (i.e., the side with the active barrier membrane surface of "skin") and a knitted fabric sheet spacer for permeate transport on the opposite, i.e., permeate side. Using industrial adhesives and cements well known to this art or other sealing means such as heat sealing the various sheets or leaves of membranes and spacers are "glued" to form the flow paths, normally immediately before winding the membrane into a rigid cylinder. After the optional end-cups, and other housing parts are glued onto this cylinder and all of the seals are cured, the spiral membrane element may be inserted or connected to apparatus as the case may be for filtration purposes. In reverse osmosis applications the element with end cups attached is usually inserted in a pressure vessel tube for high pressure filtration (e.g., 4–100 atmospheres).

Obviously, depending upon the desired flow configuration, it is conventional in the art to have a number of repeating membrane envelopes (5–15) and spacers wonnd about a single porous core tube. Unlike the spirals of the prior art, in the RFP element which can provide a very long flow path for the feed, it is desirable that fewer, even a single or double membrane envelope will prove most useful for the application intended. Unlike the conventional spiral wound membrane elements which must be staged in a series to achieve high conversion, the RFP element can be designed to achieve the desired conversion within a single element with overall capacity increased by parallel flow through additional elements.

DETAILED DESCRIPTION OF DRAWINGS

FIG. 1 shows a cut-away view of a typical reverse osmosis spiral wound membrane element 1 of this invention within a cylindrical RO pressure vessel 2. The membrane element 1 is sealed within the pressure vessel 2 with end plates 2a and 2b containing ports for the various feed, concentrate and permeate nozzles and retained in position by ring clamps 10a and 10b. "O" ring seals 6, 6a, 6b, 6c, 6d, 6e and 6f are shown as solid dark rectangles at the principle points where the membrane element or its various nozzles are connected to ports of the membrane element 1, the pressure vessel 2, its end plates 2a and 2b. At the center of the RFP membrane element 1 is a porous core tube 3 around which the membrane sheets 15 and spacers are spirally wound. In FIG. 1, the porous core tube 3 contains a tube plug 4 (an adhesive plug) at the product end of membrane element 1 to prevent mixing of feed and permeate at the product end in the porous plate 5 which serves as a conduit for the product leaving the pressure vessel 2 through a permeate nozzle 11. Both lateral edges of the membrane element 1 are potted in a low viscosity adhesive 7a and 7b which seals the membrane and spacer ends and bonds the membranes and spacers to the optional end cups 9a and 9b. In place of end cups 9a and 9b the membrane element 1 can be optionally sealed in a glue "cup" of the same dimensions.

The product-side end cup 9b shown in FIG. 1 is cylindrical in shape and contains an "O" ring seal 6b to prevent leakage of concentrate into the porous plate 5. To insure sufficient encapsulation of the membrane element 1 it is preferable that the product end cup 9b length be about 6 inches, and about 3 inches in the case of the feed-side end cup 9a. The two ends of the membrane element 1 are potted in the end cups 9a and 9b individually, usually starting with the product end followed by the feed end, often on the following day. During the encapsulation process the element may be placed in a pressure chamber and blanketed with nitrogen, at e.g., 50 psig, to insure a bubble and void free seal.

At the product end of the membrane element 1 (see FIG. 1) the element abuts a rigid porous plate 5 which serves to transport the permeate fluid (product) from the product carrier fabric 14 through an outlet nozzle 11. The spacers used in the feed-concentrate channel are not shown in FIG. 1.

The concentrated feed stream flows out of the membrane element 1 from an unsealed end (not illustrated in FIG. 1) of the spiralling radial membrane flow path into an open circumferential chamber 8, defined by the space between the cylindrical element 1 and the cylindrical pressure vessel 2. Openings contained in feed end cup 9a allow the concentrate to pass out of the circumferential chamber 8 into an open space about a feed nozzle 12 and thence exit from the pressure vessel 2 through a concentrate nozzle 13.

Although for purposes of illustration only the figures show a membrane design having a permeate exit on only one side of the RFP element 1, a permeate exit may be contained on both ends with only minor changes in design. To achieve dual permeate ports the sealing technique used for the permeate side in FIG. 1 may be repeated on the opposite side together with a second permeate nozzle 11. Relocation of the concentrate nozzle 13 to another location along the pressure vessel 2 would be simple matter of design convenience.

Figure 2:
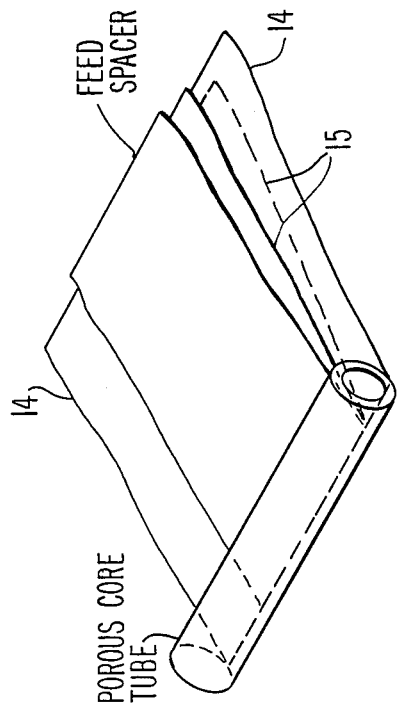
FIG. 2 is a perspective view of a typical layer arrangement to be wound about a porous tube to produce the spiral wound RFP element of the invention.

FIG. 2 is a diagrammatic illustration of a typical layer arrangement of an RFP spiral wound membrane of the invention containing product carrier fabric 14, a feed spacer, and two membrane sheets 15. The product carrier fabric 14 is typically a knit fabric capable of transporting the product fluid (usually water) along the defined permeate flow path. As illustrated, the membrane sheets 15 and the feed spacer material are recessed in width with respect to the width of the product carrier fabric 14. In order to produce effective seals, on the product side the preferred recess is about four inches, but at least about one inch, and on the feed side the preferred recess is about one inch, but at least about one-half inch.

Figure 3:
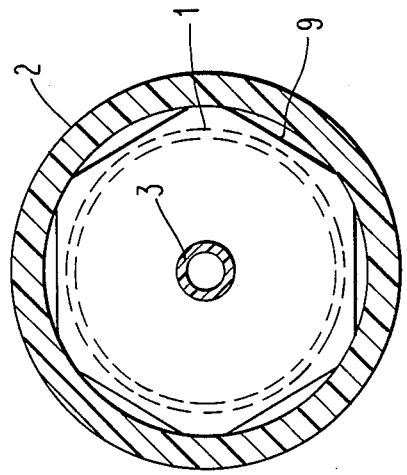
FIG. 3 is an enlarged section of a feed-side view of the RFP element of FIG. 1 taken along line 3—3.

Referring to FIG. 3, the feed side end cup 9 is of a molded hexagonal configuration with a central opening to accommodate the core tube 3.

Figure 4A:
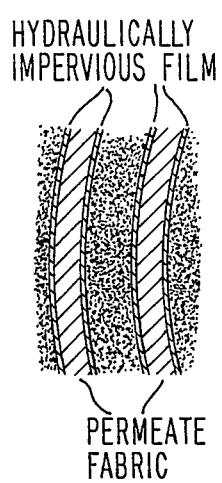
FIG. 4 is an enlarged cross-section view of a recessed portion of the permeate side of the RFP element of FIG. 1 taken along line 4—4. A portion of this section has been further enlarged in section 4a to show the positional relationship between the constituents.
Figure 4:
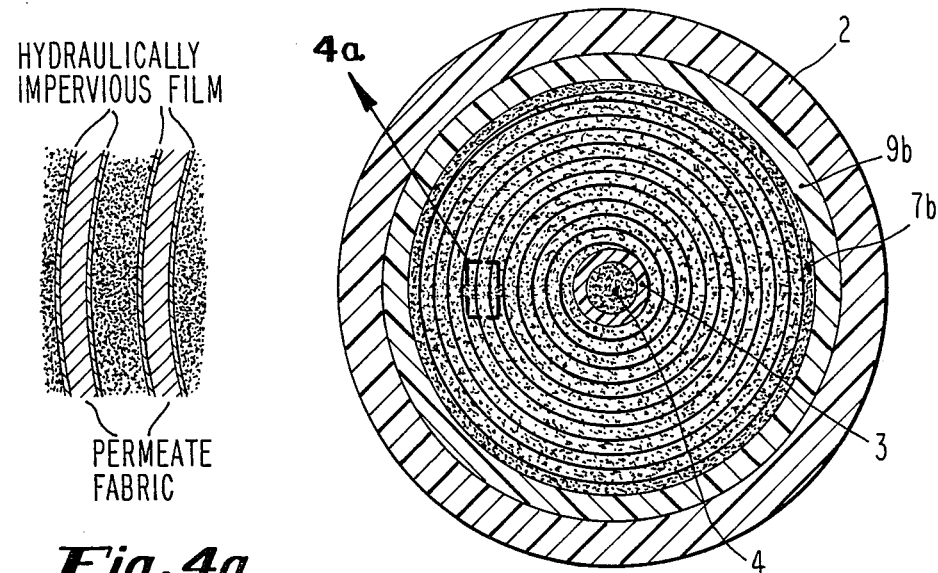

FIGS. 4 and 4a are enlarged cross sections of the element 1 of FIG. 1 and a further enlarged view of the potted permeate fabric of the element, respectively. In FIG. 4 the outer ring is the pressure vessel 2 into which is fitted the product-side end cap 9b. The adhesive 7b hydraulically seals the end cup 9b to the spiralling potted carrier fabric 14 (represented by the solid spiralling line) the only sheet of the membrane layer arrangement illustrated in FIG. 2 which extends to the product end of the element 1. In the further expanded view of FIG. 4a, the permeate carrier fabric with a thin impervious film on either side thereof is shown potted in adhesive 7b. The product carrier fabric 14 spirals outwardly from the porous core tube 3, with a central adhesive tube plug 4, to the adhesive layer connecting it to the end cup 9b.

Figure 5A:
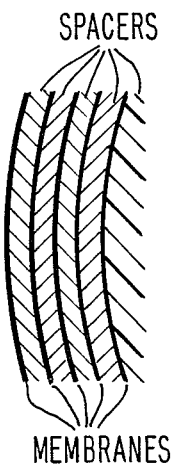
FIG. 5 is an enlarged cross-section view of a nonrecessed portion of the permeate side of the RFP element of FIG. 1 taken along line 5—5. A portion of this section has been further enlarged in 5a to show the positional relationship between the constituents.
Figure 5:
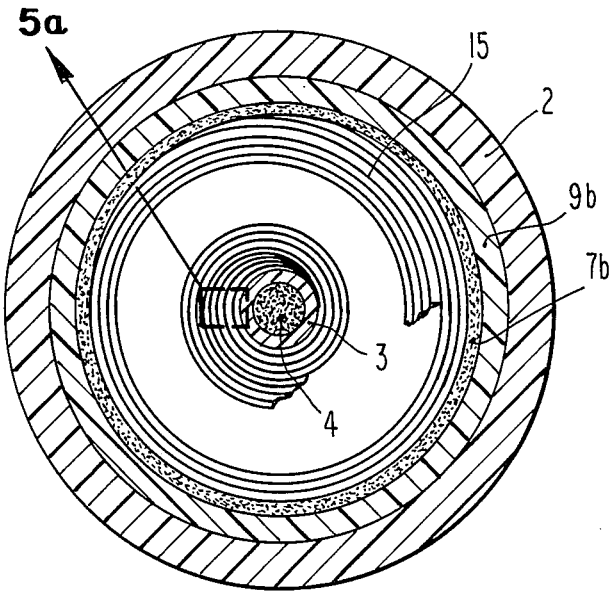

FIGS. 5 and 5a are views of the non-recessed portion of the membrane element 1 of FIG. 1 along line 5—5. In FIG. 5 the solid spiralling lines represent the membrane sheets 15 and the spaces between represent the feed-concentrate and permeate flow channels with spacers and adhesive 7a omitted. In FIG. 5a the hatched lines represent spacers between membrane leaves. (again the adhesive 7a is omitted).

FIG. 6 is a diagrammatic representation of a conventional spiral element of the prior art in an exaggerated "unwound" state intended to illustrate the flow direction of the feed-concentrate and permeate in such elements. FIG. 6a is a view of the spiral element of FIG. 6 along the line 6a–6a. Channels a and c are feed-concentrate channels with b the permeate channel. The barrier layer ("skin") sides of the membrane pairs face each other in channels a and c, with spacers not shown, and channel b for permeate is defined by the opposite (permeate) sides of the membrane pairs. The feed stream flows axially into one end of the open membrane channels a and c wherein a portion of the feed permeates the membrane skin into the adjacent permeate channel b and the remaining feed (now concentrate) exits through the opposite axial end of the membrane channels. The permeate flows inward to the core tube at right angles to the feed, and spirals down to ultimately leave the spiral winding through the porous core tube and out of the element. To direct the flow path as described, the membrane and spacer leaves are sealed at the indicated places represented by shaded areas in FIG. 6 and 6a. Thus it may be seen that the permeate channel b is sealed on all sides except at the openings in the porous core tube. Seals at the core tube between permeate and feed-concentrate channels illustrated in FIG. 6a are essential to prevent mixing at that location.

FIG. 7 represents a preferred embodiment of the novel RFP element of the invention. The feed enters a porous core tube where it is distributed at right angles (see arrows) into the outwardly spiralling membrane channel b. FIG. 7a is a view of the spiral element of FIG. 7 along the line 7a—7a. These figures do not accurately show the geometry of the RFP element but are intentionally distorted from scale to more clearly illustrate the flow patterns of the various fluid fractions within the membrane channels. The concentrate leaves the membrane channel b at the outer edge of the spiral winding after passing the full length of the membrane channel. As illustrated, the feed-concentrate channel b is sealed at both lateral edges (see FIGS. 7a) whereas the permeate channel on the permeate sides of the membranes (illustrated as channels a and b) are sealed at one lateral edge, (see FIG. 7a) longitudinally at the porous core tube, and at the terminal edge of the spiralling membrane sheets (see FIGS. 7 and 7a). Illustrated in FIG. 7a are seals for each membrane at the core tube to prevent lateral mixing of permeate and feed-concentrate.

Because the length of the membrane in the RFP spiral is not constrained by any operating limitations, such as backpressure from the permeate side, the flow path can be shortened or lengthened to "tailor" the flow path to the desired degree of conversion or concentration of the feed. In this regard the area of the flow path and to a certain extent the type of fluid flow, i.e., whether laminar or turbulent, determines the transmembrane passage of the permeate. Prohibitive back pressure is avoided by allowing the permeate to leave the spiral at right angles to the feed-concentrate flow at one or both axial ends of the cylindrical element.

Permeation of a portion of the feed through the membrane along the feed-concentrate flow path causes a gradual reduction of the feed volume, thereby diminishing feed velocity in a fixed-dimension channel and reducing the downstream permeation efficiency. This phenomenon is exacerbated by the present invention which provides the possibility of a much longer feed flow path (RFP). Design modifications of the RFP element can reduce or virtually eliminate such feed velocity changes. Some of the more obvious design changes include (1) using a tapered spacer to progressively reduce the distance between membranes thereby constricting the downstream flow path and increasing fluid velocity or (2) taper the width of the flow path by sealing the edges closer to the middle along the spiral path. A preferred embodiment of the invention utilizes a novel option inherently provided by the RFP to internally "stage" a single element. Accordingly, two, three or more membrane envelopes of different lengths (measured radially from the core) can be wound about a single core tube yielding multiple stages as the feed volume decreases along its spiral path (see, e.g., Examples III and IV, infra). Various other options should be obvious to those skilled in the art.

The radially spiralling feed flow path of the invention offers a much longer potential net flow path length than the traditional axial flow direction for the industry's standard spiral modules. This affords correspondingly greater flow conversions without reduction in permeate volume or quality. However, this novel flow path design requires a high pressure seal between the feed and permeate streams located outside of the membrane envelope; a requirement which is not necessary in the standard spiral module flow geometry. Such a pressure seal is producable using an adhesive and a compatible bonding surface. Not only must the bonding surface be compatible with the sealing adhesive, it must also act as a shield for the product water carrier to insure an unobstructed pathway for the exiting permeate.

In a preferred embodiment, it is most desirable to coat or laminate a hydraulically impervious film onto the product (permeate) carrier fabric at the product end thereof to achieve suitable bonding to seal the product end of the element. This coating or film, preferably a polymer film or metal foil must be carefully applied to avoid substantial penetration into the knit permeate fabric which could reduce transport of product through the fabric particularly in a reverse osmosis operation. We have found that this may be accomplished by applying a uniform non-porous polyurethane coating to the surface of the fabric which is to be located at the product end. The polymer coating is of such composition and thickness that it will adhere uniformly to the surface of the fabric even when the fabric is rolled into a tight cylinder in a spiral membrane element. The length of the coating or film should be sufficient to form parallel planar fluid seals about the knitted fabric, usually about 3-12 inches and preferably 6-10 inches long. To obtain an effective seal at a product (permeate) end of the RFP spiral element of the invention it is normally necessary to recess the membrane and feed spacer materials, allowing only the permeate fabric to extend to the end of the element. Thus only the knit fabric, which serves as the permeate conduit is visible from the product end of the RFP element.

For convenience, the term "product" is used herein to identify the permeate of a reverse osmosis desalination element. In some types of membrane separations the feed-concentrate stream is the true product and the permeate is a waste or recycled stream. Further, it is even possible that both the permeate and feed-concentrate streams are considered as product streams in the sense that both have uses after separation, e.g., ultrafiltration of electrocoat paint where both paint solids (concentrate) and permeate water are reused in the painting-rinsing operation.

The principle of this invention is useful in any spiral wound membrane device employing flat sheet membrane for reverse osmosis, ultrafiltration, membrane softening, microfiltration, and gas separation, requiring the use of recoveries greater than 20/30%, the limit of currently available RO spiral wound elements based on present engineering practice. This invention allows a single element ranging in lengths of about 12–60 inches to operate under turbulent or chopped laminar flow conditions at recoveries up to 90% while maintaining boundary layer conditions similar to current brine staged spiral system designs using 12 to 18 elements in series. Said another way, the degree of conversion/-recovery of the feed stream is independent of the length of a module, but rather depends upon the length of the radial flow path which affects only the diameter of the module.

Membranes for UF, RO MF and gas filtration are wellknown in the prior art. Both anisotropic (asymmetric) membranes having a single or double barrier layer (skin) and isotropic membranes are presently made in flat sheet form for UF, RO, MF and gas filtration (see e.g., U.S. Pat. Nos. 3,615,024; 3,597,393; and 3,567,632). The membranes may be of a single polymer or of a copolymer, laminated or of a composite structure wherein a thin barrier coating or film, charged or uncharged is formed over a thicker substrate film, the latter being either porous or non-porous (diffusional). The polymers suitable for such membranes range from the highly stable hydrophobic materials such as polyvinylidene fluoride, polysulfones, modacrylic copolymers polychloroethers and the like normalloy used for UF, MF and gas filtration applications and as substrates for RO composites, to the hydrophilic polymers such as cellulose acetate and various polyamines (see, e.g., U.S. Pat. Nos. 4,399,035; 4,277,344; 3,951,815; 4,039,440; and 3,615,024).

In low pressure applications (e.g., 2–10 atmospheres) such as ultrafiltration and microfiltration the spiral wound element may be optionally mounted permanently in its own pressure container or cartridge having suitable fittings for connection to the filtration systems.

The following examples serve to further illustrate the invention but should not be construed as in any way limiting the broader aspects thereof.

Example I

A six inch diameter element was prepared by rolling a single feed channel (2 membranes) element comprising a 280 inch by 40 inch sheet of knitted fabric covered with a plastic coating 3 mils thick at a height of 8 inches on the permeate side. The edge of the coatingfabric laminate was sealed with a low viscosity adhesive to prevent the potting adhesive from sealing the permeate water conduit. The length of the coating was trimmed so that it covered the fabric for a length of 230 inches. This was necessary to allow sealing the ends of the element with adhesive during the rolling operation. Two leaves of a composite membrane having a polysulfone substate in a flat sheet configuration, 240 inches by 33 inches, were cut and placed on the element to leave a recess on the feed and permeate sides from the edge of the fabric material of 1 and 4 inches, respectively. A 40 inch porous core tube was mounted on a rolling machine, aligned and then attached to the coated fabric with double sided tape. A 280 inch by 33 inch polypropylene brine spacer sheet material was placed between the two sheets of membrane so that the edges were aligned with the two membrane sheets. A membrane adhesive was uniformly spread around the entire periphery of the two membrane sheets to form a sealed envelope. The four sheets were then rolled around the core tube to form a spiral element. The following day the permeate/coated fabric end of the element was potted in a plastic end cup with a low viscosity adhesive for a length of six inches. The potted end was allowed to cure under an 80 psi nitrogen blanket to insure a bubble and void free potting. The following day the feed/uncoated side of the element was potted so that the feed core tube was left exposed 1 to 1.5 inches and free from adhesive. The feed side was also potted under a nitrogen blanket. One inch of the permeate side of the element was trimmed with a saw to open the permeate channel (i.e., expose the knit fabric). The element was placed in a pressure vessel with the permeate side supported by a porous support plate and thereafter tested under the following conditions: 270 psi feed pressure, 48% recovery, 3100 ppm NaCl feed solution at 25° C. The element produced 494 gallons per day (GPD) at 99.0% rejection with a differential pressure drop of 5 psi between the feed inlet and the permeate.

Example II

A 2.5 inch diameter element was prepared using a 17 inch core tube with a 15 inch wide by 20 inch long piece of coated permeate fabric. The coating material was 6 inches high and 8 inches long on the top and bottom of the fabric on the permeate edge. Two sheets of a cellulosic membrane with a non-woven substate 12 inches wide by 8 inches long were placed on either side of the fabric material to give a two inch recess from the permeate edge and a one-half inch recess on the feed edge. An industrial membrane adhesive was used to bond the membrane to the fabric material on all four sides. A piece of brine spacer netting 12 inches wide by 20 inches long was placed on top of the membrane to give the same recess dimensions as the membrane sheets. The four sheets of material were then rolled onto the core tube to form a spiral element. The following day the permeate side of the element was potted in a low viscosity adhesive under a nitrogen pressure of 30 psi. The next day the feed side was potted using a low viscosity adhesive in such a way as to allow the core tube to be exposed 0.5 to 1 inch and free of adhesive. The permeate potting was then trimmed 1 inch to open the coated permeate channel fabric. The element was tested at 430 psi, 3000 total dissolved solids (TDS) NaCl feed, 1% recovery, and 25° C. giving a flux of 13.7 GFD at 92.6% rejection.

Example III

A 8.5 inch diameter by 37 inch long element prepared by a procedure similar to Example I has two leaves, one 12 meters in length and one 6 meters in length. The two leaves are rolled into a spiral element and then potted. This results in a configuration with feed brine path lengths and boundary layers similar to conventional brine staged 2-1 arrays of six element pressure vessels. This element can operate at 75% recovery producing 7300 GPD at 97.5% rejection, 270 psi feed, 25° C., 2000 TDS NaCl feed.

Example IV

A 12 inch diameter by 60 inch long element containing an 18, 12 and 6 meter leaf is constructed by a procedure similar to Example I. The three leaves are rolled into a spiral element and then potted. This results in a configuration with feed brine path lengths similar to conventional brine staged 3-2-1 arrays of six element pressure vessels. This element can operate at 90% recovery producing 23,000 GPD at 98.0% rejection operating at 420 psi feed pressure, 25° C. and 2000 ppm NaCl feed.

Example V

Following the procedure set forth in Example II an RFP membrane element comprising two membrane leaves of different lengths was assembled. The membrane sheet consisted of a polyamide interfacial composite on a polysulfone substrate. The element was tested under the following conditions: 270 psi feed pressure, 2100 ppm NaCl feed solution at 25° C., 4% recovery. The element produced a flux of 9 GFD at 96.4% rejection of the NaCl.

We claim:

1. In a membrane filtration device of the cylindrical spiral wound type and suitable for filtering a fluid feed mixture under elevated pressure wherein sheet membranes are tightly wound about a central porous core tube providing separate flow channels for a feed-concentrate mixture and a permeate fluid produced therefrom by means of seals to prevent intermixing of the feed-concentrate and permeate fluids, the improvement which comprises means for providing radial flow for the Feed-concentrate mixture to an extent sufficient to achieve a conversion of 30% or greater while maintaining turbulent or chopped laminar flow, said means including, at least one pair of membrane sheets attached at one end to, and wound to spiral outwardly about the central porous core tube and sealed to define at least one radial feed-concentrate flow channel extending between a channel opening at the central porous core tube and another opening at an unsealed terminal end of the spiraling membrane sheets, each feed-concentrate flow channel connected to separate conduit means for delivering feed mixture to and discharging concentrate from the feed-concentrate channel, and the membrane sheets sealed on the permeate side to define at least one permeate channel for permeate discharge from at least one unsealed axial end of each permeate channel, and each permeate channel having spacer material therein being connected to conduit means for collection of said permeate.

2. The membrane filtration device of claim 1 wherein each of the radial feed-concentrate flow channels and axial permeate channels is sealed with adhesives.

3. The membrane filtration device of claim 1 wherein each radial feed-concentrate flow channel contains a porous spacer sheet and each permeate channel contains a porous fabric sheet.

4. The membrane filtration device of claim 1 wherein the membrane sheets are of the reverse osmosis type.

5. The membrane filtration device of claim 1 wherein the membrane sheets are of the ultrafiltration type.

6. The membrane filtration device of claim 1 wherein the membrane sheets are of the microfiltration type.

7. The membrane filtration device of claim 1 comprising a spacer sheet in each permeate channel consisting of a knitted permeate fabric having a hydraulically impervious plastic film laminated to at least one edge thereof.

8. The membrane filtration device of claim 1 wherein the membrane sheets and all spacers except those in the permeate channels are recessed at least about one inch from the axial end of the wound membrane at each permeate discharge end of the wound membrane sheets.

9. The membrane filtration device of claim 1 additionally having at least one lateral edge of the spirally wound membrane sheets potted in a low viscosity adhesive for a distance of at least one inch from the axial end.

10. A method for filtering a fluid mixture containing dissolved salts which comprises filtering said mixture through the membrane filtration device of claim 1 wherein the membrane sheets consist of reverse osmosis membranes.

11. A method for desalinating a brackish or sea water mixture which comprises filtering said mixture through the membrane filtration device of claim 1 wherein the membrane sheets consist of reverse osmosis membranes.

12. A method for separating water and any dissolved salts contained therein from larger dissolved or suspended molecules in a fluid mixture which comprises filtering said fluid mixture through the membrane filtration device of claim 1 wherein the membrane sheets consist of ultrafiltration membranes.

13. A method for separating large dissolved molecules or particulate materials from a fluid mixture containing the same which comprises filtering said fluid mixture through the membrane filtration device of claim 1 wherein the membrane sheets consist of microfiltration membranes.

14. In a membrane filtration device of the cylindrical spiral wound type and suitable for filtering a fluid feed mixture under elevated pressure wherein sheet membranes and spacer sheets are tightly wound about a central porous core tube providing separate flow channels for a feed-concentrate mixture and a permeate fluid produced therefrom by means of seals to prevent intermixing of the feed-concentrate and permeate fluids, the improvement which comprises means for providing radial flow for the Feed-concentrate mixture to an extent sufficient to achieve a conversion of 30% or greater while maintaining turbulent or chopped laminer flow, said means including, at least one pair of membrane sheets, separated by a porous spacer sheet, attached longitudinally to, and wound to spiral outwardly about a cylindrical porous core tube and sealed at both lateral edges but unsealed at the terminal edge of the spiral winding to define at least one feed concentrate flow channel extending between the membrane sheets from the porous core tube and the terminal edge of the spiraling membrane sheets, said feed-concentrate flow channel connected to separate conduit means for delivering feed mixture to and discharging concentrate from the feed-concentrate flow channel, and, on each permeate side of said membrane sheets, seals on all edges of all permeate sides of the membrane sheets except for at least one lateral edge to define at least one permeate channel for discharge of permeate from the spirally wound membrane sheets and said permeate channel conducted to conduit means for collection of said permeate.

15. The membrane filtration device of claim 14 wherein each feed-concentrate and all permeate flow channels are sealed with adhesives.

16. The membrane filtration device of claim 14 wherein all feed-concentrate flow channels contain a porous spacer sheet and all permeate flow channels contain a porous knitted fabric sheet.

17. The membrane filtration device of claim 14 wherein the membrane sheets are of the reverse osmosis type.

18. The membrane filtration device of claim 14 wherein the membrane sheets are of the ultrafiltration type.

19. The membrane filtration device of claim 14 wherein the membrane sheets are of the microfiltration type.

20. The membrane filtration device of claim 14 wherein a spacer sheet consisting of a knitted permeate fabric having a plastic film laminated to either side thereof is used to ensure a tight hydraulic seal at each permeate side of the spirally wound membrane.

21. The membrane filtration device of claim 14 wherein the membrane sheets and all spacers except those in the permeate channels are recessed at least about one inch from the axial end of the wound membrane at each permeate discharge end of the wound membrane sheets.

22. The membrane filtration device of claim 14 wherein at least one lateral edge of spirally wound membrane is potted with an adhesive in a plastic end cup.

23. In a membrane filtration device of the cylindrical spiral wound type and suitable for filtering a fluid feed mixture supplied under elevated pressure wherein sheet membranes and spacer sheets are tightly wound about a central core tube and sealed to provide separate flow paths and separate discharge ports for feed-concentrate and the permeate produced within said membrane device the improvement which comprises means for providing radial flow for the Feed-concentrate mixture to an extent sufficient to achieve a conversion of 30% or greater while maintaining turbulent or chopped laminar flow, said means including using a porous knitted fabric sheet located in each permeate channel and coated or laminated with an adhesive compatible, hydraulically impervious polymer film at both sides of the porous knitted fabric sheet at a location where the porous knitted fabric sheet is potted in an adhesive, to facilitate the transport of permeate.

24. The membrane filtration device of claim 23 wherein the polymer film does not substantially penetrate the porous knitted fabric sheet.

* * * * *